(12) United States Patent
Aho

(10) Patent No.: US 7,250,287 B2
(45) Date of Patent: Jul. 31, 2007

(54) "TRANSFORMER" AEROBIC DIGESTION METHOD, A SYSTEM FOR TREATING BIODEGRADABLE WASTE MATERIAL THROUGH AEROBIC DEGRADATION

(75) Inventor: Richard Lee Aho, Marquette, MI (US)

(73) Assignee: Richard L. Aho, Marquette, MI (US)

( * ) Notice: Subject to any disclaimer, the term of this patent is extended or adjusted under 35 U.S.C. 154(b) by 0 days.

(21) Appl. No.: 11/091,293

(22) Filed: Mar. 29, 2005

(65) Prior Publication Data

US 2006/0105447 A1  May 18, 2006

(51) Int. Cl.
C05F 17/00 (2006.01)
C05F 9/04 (2006.01)

(52) U.S. Cl. .......................... 435/262; 435/290.1; 71/9; 405/129.25; 405/129.7

(58) Field of Classification Search ................ 435/262, 435/262.5, 290.1; 71/9, 14; 166/246; 405/129.25, 405/129.65, 129.7, 129.75, 129.85, 129.95
See application file for complete search history.

(56) References Cited

U.S. PATENT DOCUMENTS

| | | | |
|---|---|---|---|
| 3,586,624 A * | 6/1971 | Larson | 210/747 |
| 5,078,543 A * | 1/1992 | Terrel | 405/129.57 |
| 5,312,754 A * | 5/1994 | Bryan-Brown | 435/286.6 |
| RE35,272 E * | 6/1996 | Mathieson et al. | 428/213 |
| 5,564,862 A * | 10/1996 | Markels, Jr. | 405/129.2 |
| 5,632,798 A | 5/1997 | Funk | |
| 5,633,163 A | 5/1997 | Cameron | |
| 5,641,679 A | 6/1997 | Pierce | |
| 5,690,173 A * | 11/1997 | Abdul et al. | 166/268 |
| 5,888,022 A | 3/1999 | Green | |
| 6,024,513 A | 2/2000 | Hudgins | |
| 6,364,572 B1 | 4/2002 | Hudgins | |
| 6,398,958 B1 | 6/2002 | Hater | |
| 6,481,929 B1 | 11/2002 | Layton | |
| 2003/0108394 A1 | 6/2003 | Layton | |

OTHER PUBLICATIONS

Davis-Hoover et al."Hydraulic Fracturing to Improve Nutrient and Oxygen Delivery for In Situ Bioreclamation" In Situ Bioreclamation. Butterworth-Heinemann (1991), pp. 67-83.*

* cited by examiner

*Primary Examiner*—William H. Beisner

(57) ABSTRACT

This method facilitates the cost effective treatment of liquid, hazardous, and solid waste in a landfill or composting site or any other containment facility. The ability to distribute the oxygen to the waste, facilitate aerobic degradation, and remove the spent waste are the focal points of the process. This invention can digest any size landfill or treat any size green waste pile. Waste moisture content is increased, eliminating fires and the aerobic degradation halts the production of harmful greenhouse gases and odors. Liquid is oxygen-supplemented and added to the waste to maintain aerobic degradation. Temperature increases with the availability of the dissolved and released oxygen. The bacteria break down the solids and liquid waste. The digested material is available for release, cover or agricultural uses. Facility space is recovered, odors are minimized, and environmental risk is minimized. Leachate to be discharged is isolated and treated to the needs of the facility, which can be anywhere between total treatment and pretreatment. The isolation and use of the landfill generated biological colony makes the current invention unique as a leachate and solids treatment system.

17 Claims, 8 Drawing Sheets

"TRANSFORMER" AEROBIC DIGESTION METHOD, A SYSTEM FOR TREATING BIODEGRADABLE WASTE MATERIAL THROUGH AEROBIC DEGRADATION

CROSS-REFERENCE TO RELATED APPLICATIONS

N/A

STATEMENT REGARDING FEDERALLY SPONSORED RESEARCH OR DEVELOPMENT

N/A

REFERENCE TO SEQUENCE LISTING, A TABLE, OR A COMPUTER PROGRAM LISTING COMPACT DISK APPENDIX

N/A

BACKGROUND OF THE INVENTION

Aerobic digestion of organic matter has been used by man from the beginning of civilization, until the development of this invention it had not been utilized to treat the unnaturally large volumes of materials that has been concentrated in our current waste collection system. The "Transformer" method is the result of understanding the aerobic process and augmenting it to meet the advanced needs of our society. The current state of the art in landfill or composting facility systems lack the ability to soundly deal with the millions of tons of garbage and waste material produced throughout our society. The dry tomb model calls for the garbage and waste material to be entombed forever as a final solution. Other methods of aerobic treatment are expensive, decrease short-term environmental protection, or are simply impractical. This method can be used with boreholes and constructed beds of drainage materials but these additions are more costly and less effective than the available options.

Domestic environmental regulations call for expensive long-term monitoring that appears to be inadequate to protect our natural resources from contamination. The other methods don't effectively eliminate the long-term and short-term liability of solid waste facilities. All other treatment methods, especially aerobic treatment methods, require large up front expenditures, high operating costs and prohibitive maintenance costs.

Current anaerobic degradation of solid waste facilities is so slow that that it is not practical to use it effectively during the useful life of most solid waste facilities. The invention described herein is cost effective because of its speed and its approach. Old aerobic, anaerobic, and dry tomb methods are inadequate due to the odors, greenhouse gases, groundwater contamination, fires, leaks and structural instability in both the short and long term. The current invention can eliminate or minimize all these problems in a cost effective manner.

The dry tomb model is the current method mandated by the EPA Subtitle D regulations and calls for the garbage and waste material to be entombed forever. This method guarantees failure. Unless the waste is treated within the effective life of the liner system, environmental contamination will occur when the liner fails.

Environmental regulations call for expensive long-term monitoring. The other methods don't effectively eliminate the long-term and minimize the short-term liability of solid waste facilities. Unless the waste is treated within the effective life of the liner system, environmental contamination is most likely to occur after the monitoring period is over; the best available plan, before this invention, is to delay the problem.

The standard aerobic design for composting facilities requires operators to mechanically "turn" the material or to suck or blow air into the pile. It only works on a small scale because they cannot introduce sufficient oxygen into a large static pile and it is too expensive and slow to turn it with heavy equipment. Despite the noted performance, the aerobic treatment methods in use up to this time require large up front expenditures and high maintenance costs.

There are two types of aerobic methods that have been put in use, both with major operational deficiencies. Those aerobic landfill systems pump oxygen (air) into the waste, dry it out, and it develops enough heat to cause combustion. One system blows air into drilled wells, the other blows air into the leachate collection system. Difficulties with these designs include getting sufficient oxygen into the waste and distributing it. In addition to failing to accomplish effective distribution, these methods have very high maintenance costs due to the hostile environment of a waste pile. The capitol costs to treat a ton of waste are significant and the incremental cost per ton restrict the possibility of economic viability.

The solid wastes treated by the invention include, but are not limited to municipal solid waste (MSW), industrial waste, construction demolition debris, storm debris, green waste, certain hazardous wastes and contaminated soil. MSW refers to solid waste produced by homes and business. Industrial waste is used to describe waste produced by heavy industry. Heavy industry would include foundries, refineries, and manufacturing plants, among others. Hazardous wastes are defined by regulatory agencies as being toxic, corrosive, reactive, or otherwise difficult to deal with. Construction demolition debris includes the wood, shingles, insulation, masonry and assorted other material generated during the demolition and building of homes and commercial structures. Storm debris includes the mixture of waste produced during unusual weather events. The material is characterized by trees, buildings, and any other property such as boats or signs that might be damaged by weather. Green waste includes plants, grass, leaves, trees, and sometimes food or food processing waste.

The liquid or pumpable wastes treated by the invention generally fail the U.S. EPA paint filter test and include, but are not limited to sludge, leachate, contaminated groundwater, contaminated surface water, sewage, stormwater, liquid industrial waste, process water, spoiled liquid products and mine drainage. The term definitions include, but are not limited to:

Industrial waste—Waste both liquid and solid that are not hazardous waste and produced in an industrial setting.

Grey water—Liquid waste from homes and restaurants that does not include human waste.

Sewage—Liquid waste that contains human waste.

Process waster—Water that is used in a process and contaminated such that it cannot be released into the enviromnent without effecting the environment.

Mine drainage—Liquid that is contaminated due to contact with materials in a mining environment.

Leachate—Water that has come in contact with materials and has "leached" portions of said materials into solution.

In addition to hydrogen peroxide, other oxygen releasing compounds include magnesium peroxide, permanganates, calcium peroxide, and other similar compounds.

BRIEF SUMMARY OF THE INVENTION

The present invention relates to an optimum method and system for treating biodegradable waste material. It is a convenient and cost effective aerobic degradation process and system that minimizes the long-term liability of a landfill or composting facility. This is the system that brings aerobic treatment to massive static compost and MSW megafills.

This method of aerobic treatment is inexpensive, drastically improves environmental protection, and is practical. This is the only system in existence that can cost effectively aerobically digest the waste in a landfill. It will work on a small or large scale and is economic improvement over even the old small-scale simplistic composting operations. This invention includes systems that pump aerated liquid into the waste that will be degraded. The liquid is aerated and added to the waste. Air or oxygen can be added by compressed air being mixed with the liquid in a mixing nozzle, a venturi, or other method that increases the oxygen content of the liquid at the point shortly before, or during the time that the liquid is contacting the waste, including the freezing of the liquid as well as the addition of chemical substances to the liquid that break down and release oxegen. Freezing of the liquid includes treating a waste pile with snow or liquid waste that has been aerated or vaporized and frozen. The liquid addition equipment is large scale and mobile. The addition of oxygen-enriched liquid to the waste feeds the internal biological colony. The process has degraded MSW on a full size landfill scale in Marquette, Mich. and will work on any size waste pile.

Because of the significant flows required to maintain the aerobic process, the use of supplemental drainage media may be required to control the process depending on the characteristics (such as size) of the individual facilities. Each site will use the process in a slightly different manner, but all will add oxygen with a liquid distribution media. This oxygen-water mix eliminates the fire threat. The simple supplemental drainage system is inexpensive or uses waste material available to the facility and works under adverse conditions. Common occurrences like subsidence can destroy an emitter system, while a simple drain is unaffected. This method solves the fundamental problem of the methods that preceded it, the effective distribution of oxygen and water in the waste pile.

Off the shelf items like pumps, valves, and piping make the system inexpensive and flexible. Ambient air and a venturi is cost effective if water pressure is available, compressed air can work effectively with low-pressure flows. Any device that furnishes a flow of aerated liquid to the waste is acceptable and should be consider a version of this invention. If oxygen, sufficient to sustain aerobic degradation, is delivered to waste by a liquid, then it is using this method.

The invention described herein is cost effective because of its speed and its new approach. The method calls for aerated water, leachate or wastewater to be distributed within the waste. This creates an aerobic environment that quickly breaks down the waste, eliminates the possibility of fires and minimizes odors. Aerobic bacteria do not produce the sulfur related trace gases that, at minimal concentration, are very offensive to the average human. The aerobic bacteria minimize greenhouse gases and do not permit the slower anaerobic bacteria to exist in sufficient numbers to be a problem. Landfill greenhouse gasses are very harmful to the earth's atmosphere and are highly objectionable to the human nose. Aerobic bacteria thrive with oxygen, water, and food (waste) and they produce carbon dioxide, soil and heat from the process.

The construction design and methods used in this invention facilitates the cycling of water through the system, minimizes or eliminates the possibility of leakage through the liners, minimizes or eliminates pressure on the liner, minimize or eliminate the possibility of leakage over the edge of the liners, minimize or eliminate the possibility of leachate outbreaks, and maximize the volume of waste that can be stored in the landfill or composting facility. It is possible and practical to eliminate the liability of the waste by rendering it into an inert pile of compost or topsoil. Compostable materials are normally reduced in volume by 50% as they are digested. This timeframe permits the full utilization of space and produces large increases in average density (pounds of waste per cubic yard in place in the containment area) of organic materials. The method also eliminates the surface subsidence that plagues redevelopment of landfill facility sites because the loss of volume has occurred during the active portion of the landfills life.

In order to eliminate the possibility of leaks or break outs of liquids and to facilitate aerobic degradation, one or more of the following features are added to the standard Subtitle D design.

1. In addition to a subtitle D or alternative liner system, one or more additional layers of permeable, semi permeable or impermeable membranes or sheets installed in, above and below the waste that channels the liquid to the leachate collection system and protects the liner system from excessive hydrostatic pressure and other damaging influences.

2. An impermeable containment "flap" that extends out of the drainage media at the top of the external berm and in effect can produce a barrier of whatever size is necessary to contain the liquids that may come out of the waste under extreme conditions. Auxiliary drainage is installed within this final barrier.

3. An auxiliary drainage system inside the waste material pile that facilitates extraction and recirculation.

4. A vegetative cover growing in the "Transformed" waste that controls erosion, creates a surface barrier, facilitates Phytoremediation of wastes and facilitates evapotranspiration of liquids.

5. Oxygen is added to a waster based liquid that that is exposed to a waste pile. The speed of the process is controlled by the amount of oxygen added.

DETAILED DESCRIPTION OF THE INVENTION

Figure 1:
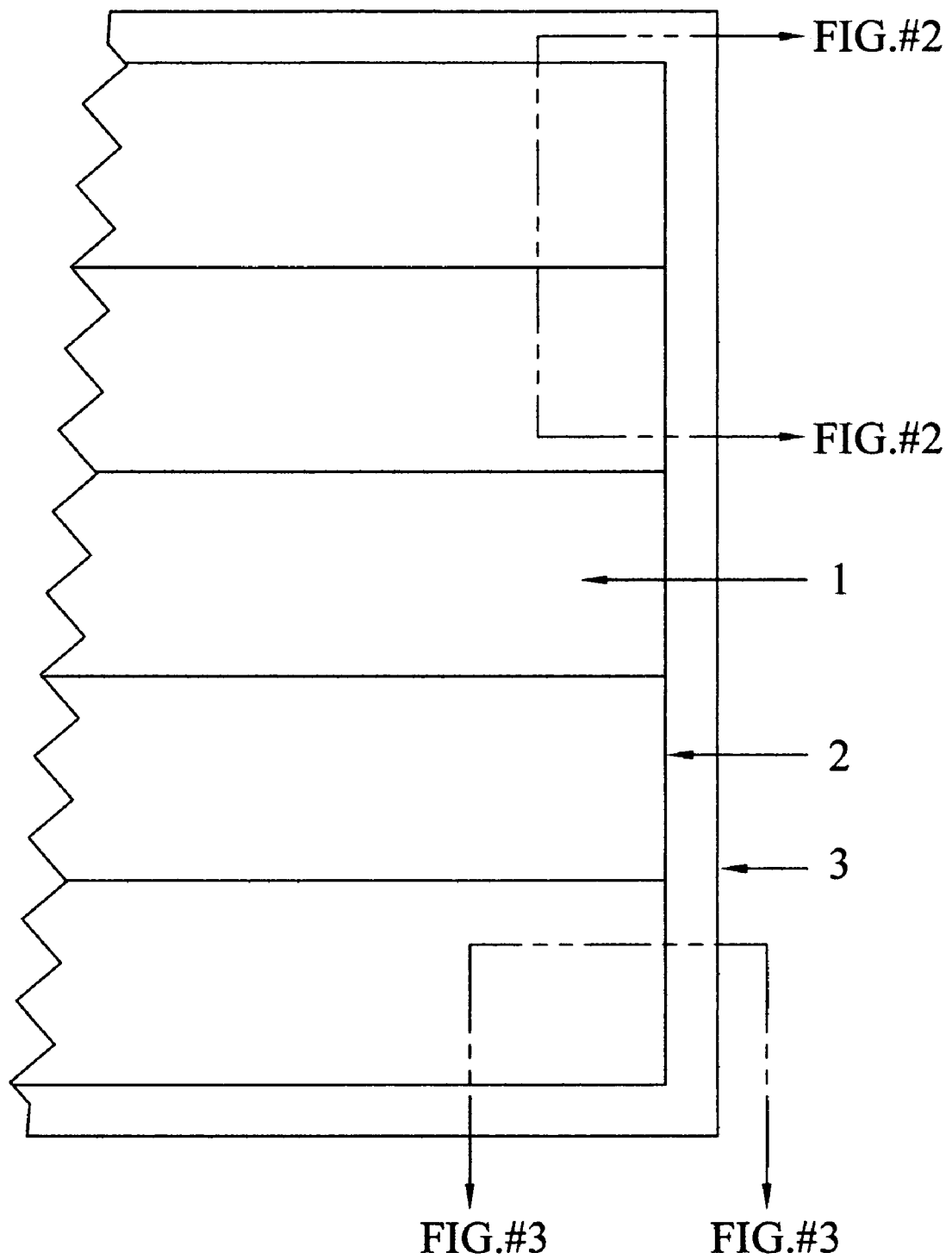
FIG. 1 is plan view of a typical large landfill or composting pile that was formed by the combining of several individual cells.

It is a principle object of this invention to provide a method and system for cost effectively treating solid, liquid, and green waste material in a landfill or composting facility through aerobic degradation. This invention encompasses methods that bring aerated liquid into contact with the waste mass of a landfill or composting facility. The equipment that aerates the leachate should be portable and inexpensive and is made so that the leachate or the waste cannot clog it up. Because of the liquid flows within the waste piles the auxiliary drainage keeps the method under control.

It is possible to utilize this landfill or composting facility system to reduce the amount of time necessary for the degradation process to stabilize the waste interred such that the land can be recycled or reused. The volume of compostable material will be reduced by about 50% and will be suitable for a wide range of beneficial uses if proper screening and processing of the waste occurs. The screening and processing can occur on the incoming waste or it can be used on the outgoing product. Both practices will work; the optimum choice will be based on the characteristics of the waste stream and the site that houses the process. Space, cycling requirements and neighbors are primary concerns when making these decisions. The waste has a great affinity for water and the oxygen is carried by the water to the small void and surface of the waste. Once the oxygen is available the bacteria break down the waste. Addition oxygen is added, as needed depending on the needs of that particular waste and the time constraint of the facility.

This quick treatment of the waste mass drastically reduces the liner requirements to achieve the same environmental protection. The landfill space that is gained is used in the short term, as additional waste can be place on top of the treated material in real time.

The invention substantially eliminates the long-term environmental liability of the waste deposited in the landfill or composting facility. A landfill or composting facility can be continuously recycled and eliminate the necessary for additional and expensive land to be dedicated to a new facility. The treated waste is acceptable for landfill cover or agricultural augmentation. The decision of recycling the processed material or simply eliminating the liability and building on top of it is an economic question that is unique to each facility. The materials that remain after the waste has been "transformed" and will be inert or close to it. Anything that was reactive will run its course within the waste pile and be neutralized.

Because the correct siting of a communities' facility may change over the years of its life, the stabilized landfill or composting facility land can be made available for other uses. The stabilized, degraded landfill or composting facility material can also be mined and used, in effect the landfill is moved and the land is ready for new alternate development.

Another principle object of the invention is to substantially decrease the amount of greenhouse gasses produced by the landfill or composting facility. Gasses can be reduced to the point that current regulatory threshold will not be met and costly abatement equipment and methods will not be necessary. It will be possible to trade emission credits for the avoided discharges. It is possible to completely eliminate the methane production of the landfill or composting facility. This methods and design eliminates the danger of landfill or composting facility fires because moisture content is normally at the maximum field capacity of the waste. There is no combustion without oxygen and there is more liquid then oxygen put into the process. The need for costly collection, injection and monitoring equipment is eliminated. It is not cost effective to continuously have to monitor a waste pile.

This invention offers cost effective aerobic digestion of waste by utilizing and reutilizing inexpensive and readily available components such as pumps, valves and venturi aerators. The use of highly permeable waste materials or reusable large pipes that act as a plenum to quickly deliver oxygenated liquids to the waste is a version of this invention.

Depending on the type and composition of the waste buried, combinations of trace nutrients and various carbon materials may be added to the waste. The addition of bacterial cultures can be used as is necessary. Phosphorus and soda ash may be added to accelerate the biological breakdown of ammonia. A system that uses aeration and aerobic bacteria in holding vessels in conjunction with circulating the liquid in a waste pile to achieve total or partial treatment of liquid waste/leachate will be considered a variation of this invention.

Partially treated liquid waste (in the waste pile) can be treated to State or EPA mandated standards in on site lagoons for cost effective on-site treatment and discharge to surface or groundwater or to a waste water treatment plant. The lagoons will be aerated and biological treatment of the waste will occur. Cultured bacteria can be added to the system to reduce treatment times. Multiple lagoons or other storage vessels can are used to facilitate the total control and optimum treatment speed of the process. Because the aerobic process is exothermic and the liquid transfer rate is high, this method includes processes that transfer heat from the waste pile and use it to optimize the leachate treatment process or transfer the energy outside the landfill or compost facility (such as out building heating and to treat the waste aerobically in lagoons, tanks, or other storage vessels). The heat and biological community from one portion of a waste pile can be used to optimize the "start up" of a different portion of the liquid waste or solid waste pile treatment.

The present method includes steps used to meet the Federal standards regarding environmental safeguards of a bioreactor landfill or composting facility. Multiple steps will be taken to eliminate the possibility of leachate escaping into the adjacent groundwater as depicted in reference drawings.

The additional security of processing the MSW and the improved design facilitates the elimination of some costly components of subtitle D facilities while still improving the overall environmental protection of the facility. This system will permit the use of a simple liner that will exceed the protection of the current state of the art Subtitle D facility. The system will "Transform" MSW into a non-regulated material with beneficial uses.

The "Transformer" Aerobic Digestion Method is an efficient and cost effective method for treating landfilled MSW, compost, leachate, liquid waste, or any other biodegradable waste material that has been deposited in a landfill or composting facility.

The solid wastes treated by the invention can include municipal solid waste (MSW), green waste, and construction debris.

The liquid wastes treated by the invention can include leachate, liquid industrial waste, sewage, grey water, and any other aerobically degradable liquid wastes.

The "Transformer" Aerobic Digestion Method consists of reducing particle size of the waste and plastic film containment of the waste. The material will be placed in a cell that conforms to the containment rules of the local environmental agency. In order for the "Transformer" Aerobic Digestion method to function the aerated liquid must come in contact with the waste material. The smaller the particle size, the faster the process occurs.

Temporary depressions facilitate the rapid infiltration of large quantities of oxygen-enriched liquid. A slotted or perforated reusable tube, that is sturdy enough to be driven into, buried in, and pulled out of the waste is also an option for liquid distribution. Waste that has high permeability can be used as a plenum to provide a low cost distribution that is used and left. Nonwaste distribution equipment is movable and recoverable. This system saturates the material to be processed and delivers sufficient oxygen to break down the waste aerobically.

This invention includes the systems that add sufficient dissolved oxygen to treat the waste in the pile and the "carrier" liquid. The liquid carries oxygen and eliminates fires, dissipates excessive heat, disperse oxygen in the waste. The aerobic bacterium thrives and eliminates odors, eliminates greenhouse gases, treats the organic solids in the waste, and consumes the contaminants in the liquid. Supplemental drainage is used to recover oxygen depleted liquid quickly, drastically reduce the possibility liquid breakout, drastically reduce the possibility the pooling of liquids, and drastically reduce the possibility of slope failure. Drainage makes the inventive method suitable for any facility in any regulatory scenario.

The upgrading of the drainage system of "subtitle D" landfill is required under some conditions. Excess moisture will be drawn off by the leachate collection system when dealing with MSW. Different wastes and conditions require different levels of augmentation of drainage. Whatever type of containment of waste that is required locally can be supplemented to safely control the additional liquid and to make the inventive method suitable for any facilities needs. The external edges of the containment liner will be extended above the drainage material and supported such that it provides emergency containment of leakage or slope failure.

This system is an efficient and cost effective method for treating leachate, sewage, stormwater or any other biodegradable liquid waste while treating the solid organics at the same time. The maintenance costs are very low, even in the harsh waste storage environment. All the components of the "transformer" system are robust, simple, and relatively inexpensive.

In comparison with the current best available technology, the process eliminates fires, greenhouse gasses, odors, leakage, long-term liability, and subsidence. It also minimizes expense, regulatory expense/difficulties, public relations problems, landfill cover cost, slope failures, landfill liner cost/risk and short-term liability. The process also maximizes landfill life, landfill income, regulatory compliance, treatment of hazardous waste, leachate pretreatment/treatment, liquid waste treatment, site reuse potential, emission credits.

SUMMATION OF PRIOR ART

Aerobic degradation of waste has been around for as long as there has been oxygen and waste. Many presentations and demonstrations have documented the aerobic process. The system described by Application 20030108394, Layton, Gordon, Jun. 12, 2003, augments the aerobic process. The primary feature of this method deals with the systematic spacing of a large number of boreholes or the layout of a "dripping emitter" grid. The holes are used for the injection of liquid or air, or air that contains a small amount of vapor. This system does not attempt to add oxygen to the liquid or in any way does it use liquid to carry oxygen to the waste. The system is complicated in that it attempts to regulate the addition of liquid and air through an extensive control system. The effects of leachate on complicated control systems are expensive and the performance of complicated systems is very difficult to maintain in the harsh environment of the landfill. This method attempts to control fires through monitoring temperature. Air was added through low pressure blowers. This system does not attempt to distribute oxygen into the liquid and it does not use liquid to distribute oxygen to the waste.

The addition of air into a waste pile will cause combustion. Layton, 2003 attempts to monitor hot spots created when an excess amount of air facilitates an opportunity for combustion and even alludes to the addition of an inert gas to cool the material. This method calls for air or water to be injected into bore holes. These injection wells, pipes, nozzles, drip points, manifolds and boreholes clog quickly in most waste environments. Adding air and water into the same hole does not aerate the liquid. The two materials go their separate ways. Saturating the waste then forcing air into it will lead to combustion and does not transmit the oxygen to the waste. The moisture actually is a barrier between the waste and the oxygen. U.S. Pat. No. 5,888,022, Green, 1999, is very similar to Layton, 2003. Green, 1999, calls for saturation of the waste then pumping in oxygen through a grid of injection wells. The method attempts to monitor temperature and add the "right" amount of oxygen in the right place. Again this system relies on separate air injection wells and water injection wells. This system does not attempt to mix the air into the liquid and it does not use liquid to carry oxygen to the waste. Compressed air is used to increase the zone of influence of the air injection wells.

Figure 2:
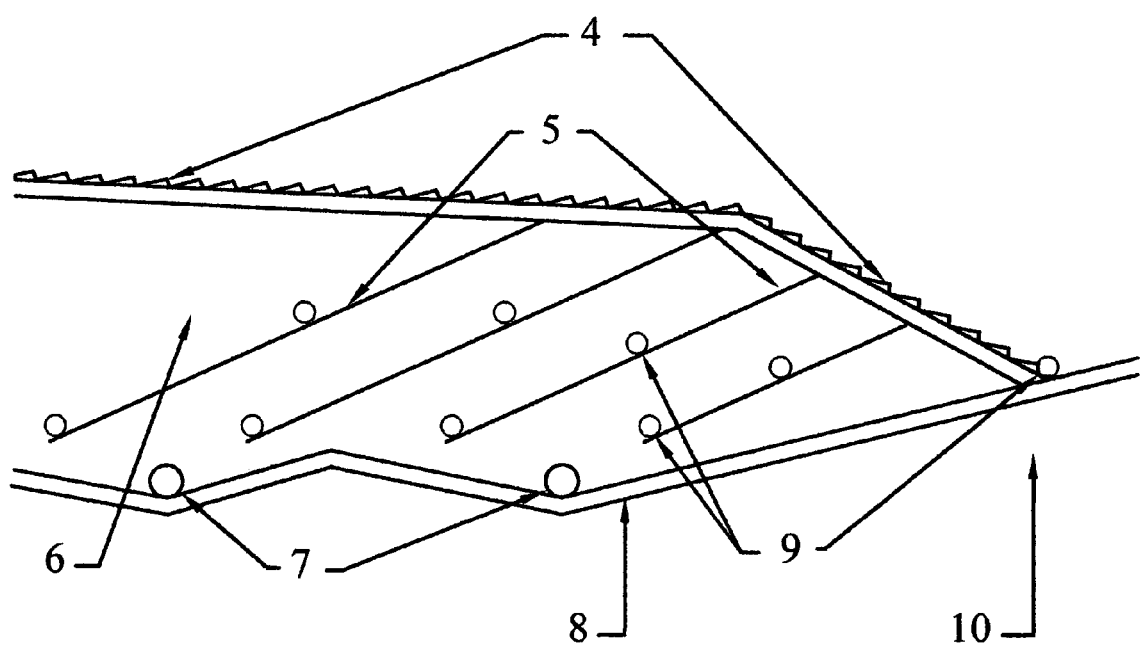
FIG. 2 is a cross-sectional view of FIG. 1. It depicts a section view of a typical large landfill or composting pile with multiple cells and drainage components. The connection between the individual drainage zones is shown in addition to the auxiliary drainage of the "transformer" method. The auxiliary drainage on the end of the berm and vegetative cover are also depicted.
Figure 3:
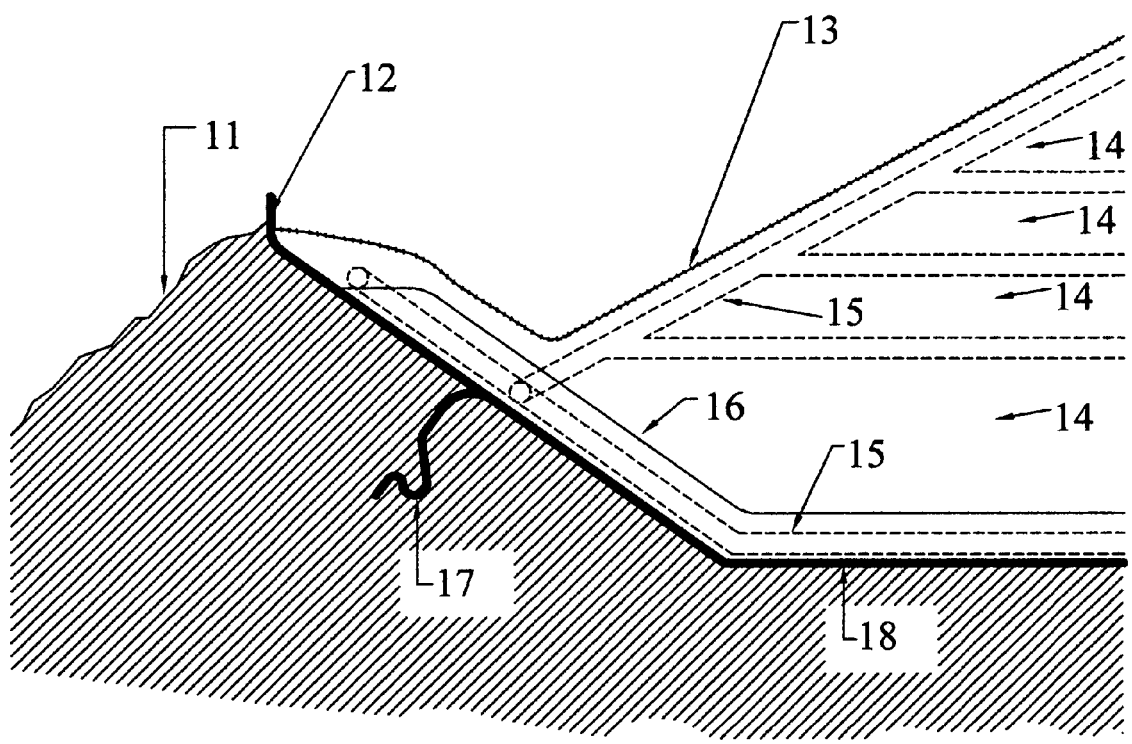
FIG. 3 is a cross-sectional view of FIG. 1 illustrating the details of the outer edge of a landfill or composting pile. This view is perpendicular to the drainage and depicts the protection afforded by an impermeable containment flap and auxiliary drainage that are characteristic of the "transformer" method.

FIG. 1 is plan view of a typical large landfill or composting pile that was formed by the combining of several individual cells. The Waste (1) is piled to the edge of the liners system (2). An additional liner stands above the soil at (3) and is supported by a soil backfill. The liner, soil support, and additional drainage protect against the possibility be a loss of containment under adverse conditions. FIGS. 2 and 3 are sections that are segregated to expose the inner features of the cells.

FIG. 2 is a cross-sectional view of FIG. 1. It depicts a section view of a typical large landfill or composting pile with multiple cells and drainage components. The connection between the individual drainage zones is shown in addition to the auxiliary drainage of the "transformer" method. The auxiliary drainage on the end of the berm and in the waste (9) and vegetative cover (4) are also depicted. Auxiliary drainage (9) at the edge of a landfill is used in landfills that have contaminated runoff that must be collected before it can leave the permitted area. The "Transformer Method" places the auxiliary drainage above the waste such that it will only be used in the event of a sideslope break out and the location permits the reuse of the material. This auxiliary drainage is the last line of defense against the loss of liquid over the berm. The use of additional drainage (9) and permeable, semipermable and impermeable membranes (5) within the waste pile is unique to the "Transformer Method". The drainage permits the quick cycling of liquids and controls stability issues. The primary leachate collection system (7) is connected to the auxiliary drainage (9) to minimize cost and complexity. The compacted subgrade (10) can have a circulation grid installed in it just below the liner system (8) to facilitate access to the heat of the aerobic reaction in the waste pile (6). The heat extraction grid can be installed within the layers of the liner system (8) itself if liquid waste will be circulated in the grid.

FIG. 3 is a cross-sectional view of FIG. 1 illustrating the details of the outer edge of a landfill or composting pile. This view is perpendicular to the long axis of drainage system (15) and depicts the protection afforded by an impermeable containment flap (12) and auxiliary drainage (15) above the liner (18) and under a permeable drainage layer (16) that is characteristic of the "transformer" method. This "flap" of impermeable material can be remove from the anchor trench (17) and reused as additional cells are added. Soil backfill (11) supports the flap (12) and minimizes the possibility of a release of solid waste (14) or liquid waste under extreme conditions. Impermeable membrane (13) or vegetative cover (13) can be used to minimize precipitation infiltration and control erosion.

Figure 4:
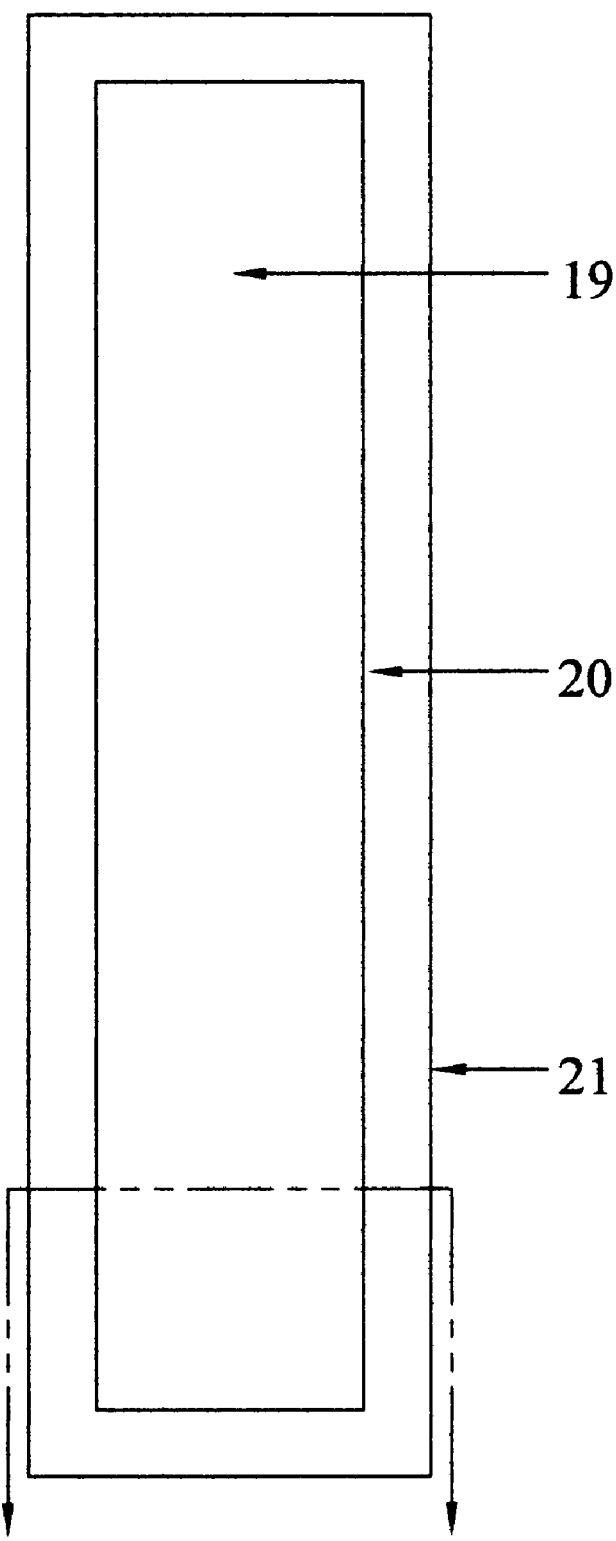
FIG. 4 is plan view of a single cell of a landfill or composting pile that will be combining with adjacent cells to form the landfill.

FIG. 4 is plan view of a single cell of a landfill or composting pile that will be combined with adjacent cells to form the landfill. Waste (21) covers the foot print (20) and the flap daylights at the top of the backfilled soils (21). The section labeled FIG. 5 exposes the inner details of the single cell.

Figure 5:
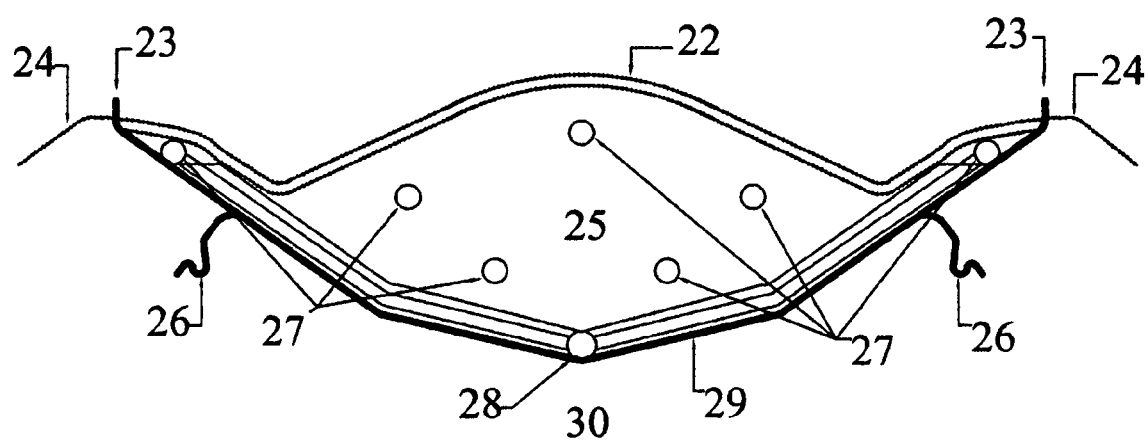
FIG. 5 is a cross-sectional view of FIG. 2 illustrating the details of the end of a single cell of a landfill or composting pile. The landfill or composting facility utilizes an auxiliary liner system that maximizes flow and minimizes head on the liner system.

FIG. 5 is a cross-sectional view of FIG. 2 illustrating the details of the end of a single cell of a landfill or composting pile. The landfill or composting facility utilizes an auxiliary drainage system (27) that is above the surface of the waste (22) on the outer edges. The auxiliary drainage (27) in the waste (25) maximizes flow and minimizes head on the liner system. The subgrade (30) is compacted and the primary collection system (28) sits on the liner system (29) and is fed by the auxiliary drainage (27). The soil backfill above the anchor trench (26) does not require the level of compaction of the subgrade as it has a limited useful life. The containment flap (23), daylights out of the soil and provides an impermeable barrier to liquid migration.

Figure 6:
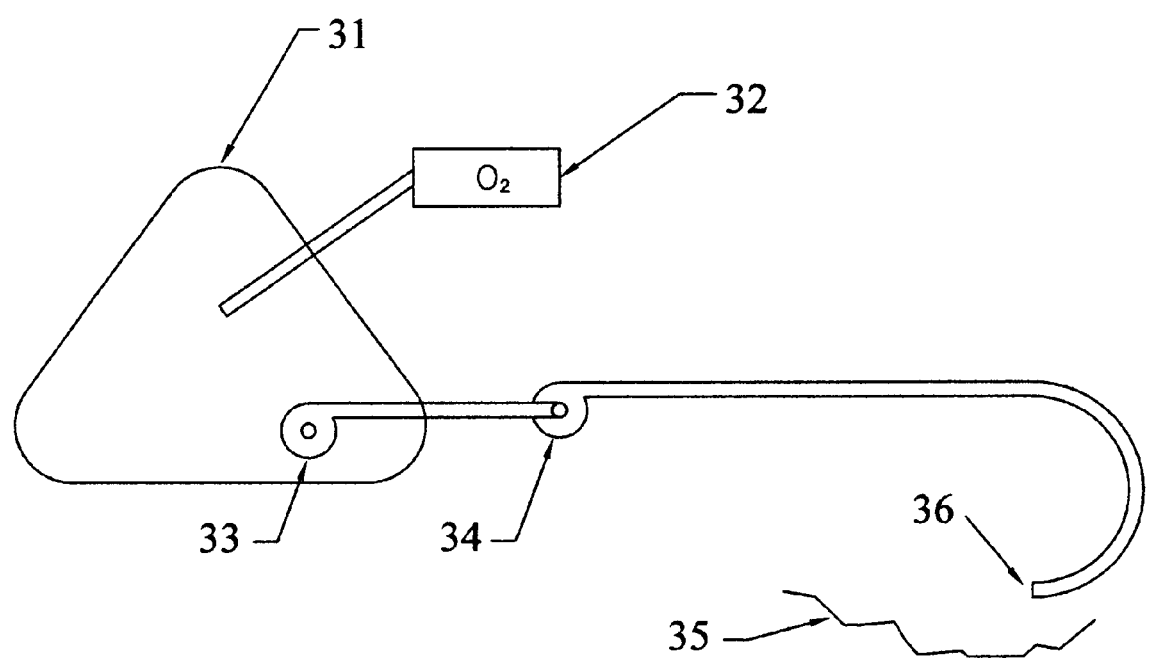
FIG. 6 is a diagram of the oxygen enrichment equipment with a reservoir-mixing chamber

FIG. 6 is a diagram of the oxygen enrichment equipment with a reservoir-mixing chamber (31). The liquid in the chamber is aerated by mixing or chemical reaction in the chamber itself (31) or in a smaller chamber (32). The aerated liquid is then pumped by submersible pump (33) or non-submersible pump (34) to contact with the waste (35) at the end of the piping (36).

Figure 7:
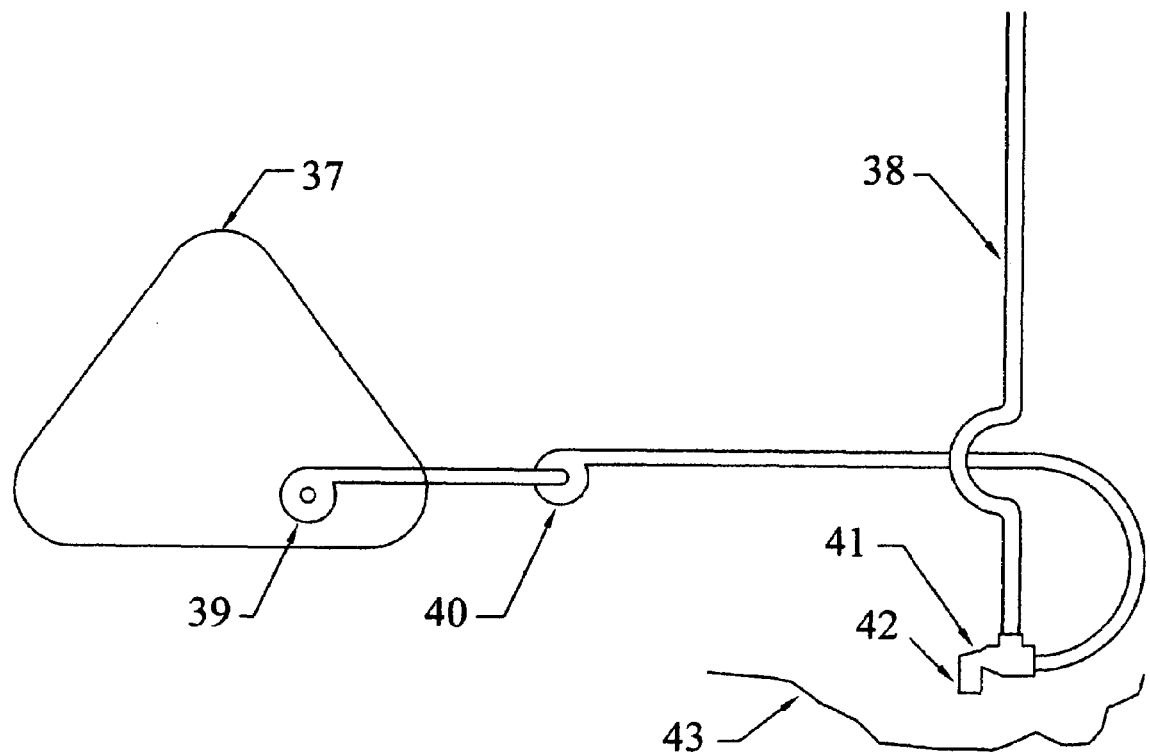
FIG. 7 is a diagram of the oxygen enrichment equipment with compressed air or oxygen arrangement.

FIG. 7 is a diagram of the oxygen enrichment equipment with compressed air or oxygen arrangement. The liquid in the chamber (37) is then pumped by submersible pump (39) or non-submersible pump (40) to the mixing chamber (41). Air or an oxygen enriched mixture is under pressure and forced into the mixing chamber (41) through a tube (38). The aerated liquid is discharged from the mixing chamber (41) from nozzle (42) to contact with the waste (43).

Figure 8:
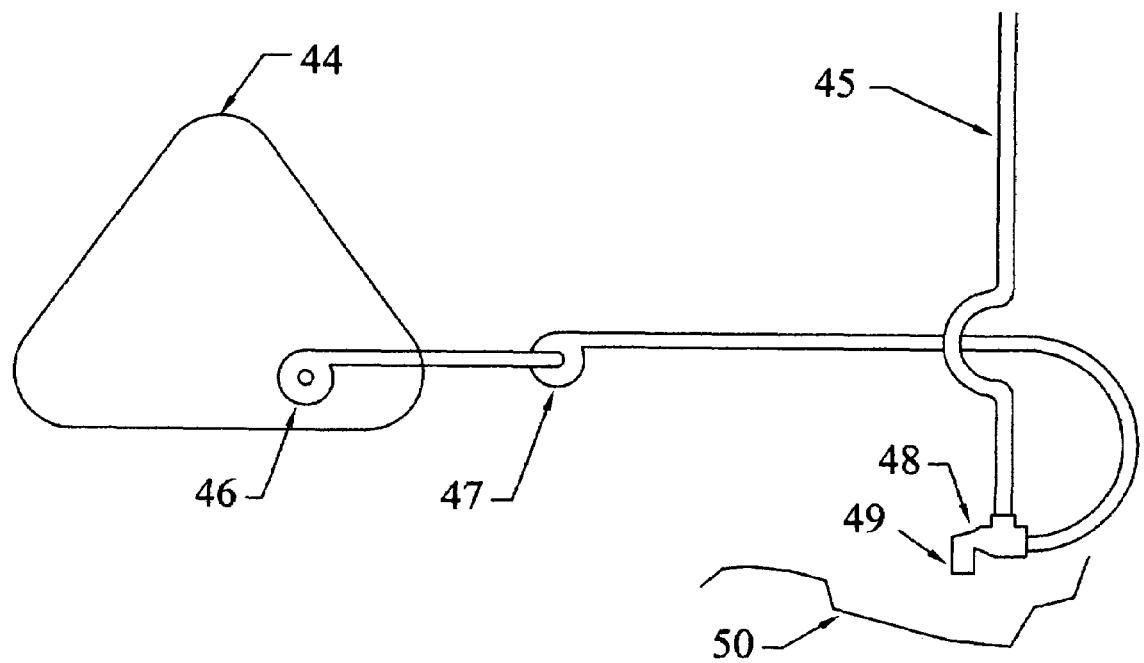
FIG. 8 is a diagram of the oxygen enrichment equipment with a venturi.

FIG. 8 is a diagram of the oxygen enrichment equipment with a venturi (48). This is the best mode use of this technology. The liquid in the chamber (44) is then pumped by submersible pump (46) or non-submersible pump (47) to the venturi (48). Air or an oxygen enriched mixture is drawn into the venturi (48) through a tube (45). The aerated liquid is discharge from the venturi (48), leaves nozzle (49) to contact with the waste (50).

What is claimed is:

1. An aerobic digestion method for treating biodegradable solid waste comprising:
    providing a liquid containment structure for holding a volume of biodegradable solid waste;
    providing said liquid containment structure with a liquid introduction system and a liquid collection system, said liquid introduction system including a mixing system for creating oxygen-enriched liquid;
    filling said liquid containment structure with a volume of biodegradable solid waste;
    providing a source of liquid;
    providing a source of air or oxygen;
    mixing said source liquid and said air or oxygen using said mixing system to create an oxygen-enriched liquid;
    introducing said oxygen-enriched liquid into said volume of solid waste using said liquid introduction system to contact said volume of solid waste so as to aerobically degrade said volume of solid waste into processed waste, wherein said mixing step is performed at the point of introduction of the oxygen-enriched liquid into the volume of solid waste and during said introducing step; and
    collecting any excess liquid within the volume of solid waste using said liquid collection system.

2. The method as in claim 1, wherein said source of air or oxygen is normal air, pure oxygen or a mixture of both.

3. The method as in claim 1, wherein said liquid introduction system includes surface excavations in the volume of solid waste, slotted or perforated tubes positioned in the volume of solid waste, or pockets of permeable waste in the volume of solid waste to facilitate the contact between the volume of solid waste and oxygen-enriched liquid.

4. The method as in claim 1, wherein said mixing step includes mixing based on pressure, chemical reactions, biological activity, mechanical entrapment methods, or any other method for creating a liquid with dissolved oxygen sufficient to aerobically degrade said volume of solid waste.

5. The method as in claim 1, wherein said mixing step includes processes that include venturis, compressed air injection, compressed oxygen injection, pressurized liquid combined with oxygen gases, and mechanical stirring.

6. The method as in claim 1, wherein said mixing step includes aeration and freezing of said liquid such that the resultant ice or snow are buried within said volume of solid waste and both liquid and adjacent solid waste are aerobically degraded.

7. The method as in claim 1, wherein said solid waste is municipal solid waste (MSW), green waste, or construction debris.

8. The method as in claim 1, wherein said source of liquid includes leachate, liquid industrial waste, sewage, grey water, or any other aerobically degradable liquid waste.

9. The method as in claim 1, wherein said liquid collection system includes a primary collection system provided at the bottom of the containment structure and an auxiliary collection system provided within the volume of solid waste.

10. The method as in claim 1, wherein internal flow within the volume of solid waste is controlled using permeable, semi-permeable and impermeable membranes placed within the volume of solid waste.

11. The method as in claim 1, wherein said processed waste is used to cover said volume of solid waste to create a vegetation cover.

12. The method as in claim 1, wherein heat generated in the volume of solid waste during aerobic degradation is captured using a heat transfer system.

13. The method as in claim 1, wherein heat generated in the volume of solid waste during aerobic degradation is captured and used to heat waste in lagoons, tanks, or other storage vessels in climates that would otherwise not have sufficient temperatures to allow aerobic bacteria to thrive.

14. The method as in claim 1, wherein said liquid collection system is provided in liquid communication with a holding vessel, liquid contained in the holding vessel is aerated so as to biological treat the liquid therein.

15. The method as in claim 14, wherein the holding vessel can be lagoons, tanks or any other type of storage vessel.

16. The method as in claim 14, wherein treated liquid in said holding vessel is discharged to surface or groundwater or to a waste water treatment plant.

17. The method as in claim 14, wherein treated liquid in said holding vessel is said source of liquid.

* * * * *